United States Patent [19]

Liddle et al.

[11] Patent Number: 4,892,647

[45] Date of Patent: Jan. 9, 1990

[54] SYSTEM FOR SEGREGATING TRASH

[76] Inventors: Franklin D. Liddle, 4144 W. Gail, Chandler, Ariz. 85226; Ottavio A. Tassielli, 1101 W. Lynwood, Phoenix, Ariz. 85007

[21] Appl. No.: 215,779

[22] Filed: Jul. 5, 1988

[51] Int. Cl.[4] .............................................. B07B 13/00
[52] U.S. Cl. ...................................... 209/11; 198/603; 209/46; 209/700; 209/930; 219/388
[58] Field of Search ................ 209/11, 45, 46, 3, 606, 209/700, 707, 950; 198/603 X, 499, 495, 952; 219/388 X, 216

[56] References Cited

U.S. PATENT DOCUMENTS

| | | | |
|---|---|---|---|
| 3,330,410 | 7/1967 | Kirk | 209/699 X |
| 3,599,788 | 8/1971 | Fyfe et al. | 209/11 |
| 3,810,735 | 5/1974 | Moser | 219/388 X |
| 4,141,450 | 2/1979 | Clin et al. | 209/700 X |
| 4,267,930 | 5/1981 | Melkonian et al. | 204/700 X |

FOREIGN PATENT DOCUMENTS

| | | | |
|---|---|---|---|
| 0022477 | 2/1979 | Japan | 209/930 |
| 0010585 | 5/1979 | Japan | 209/930 |
| 0117973 | 9/1979 | Japan | 209/700 |
| 1284605 | 1/1987 | U.S.S.R. | 209/40 |

Primary Examiner—Donald T. Hajec
Attorney, Agent, or Firm—Richard R. Mybeck

[57] ABSTRACT

A system for segregating trash into discrete fractions including a separator assemblage consisting of a staggered multiple-tiered heated belt system or separating thermoplastic materials from other substances. Each heated belt unit is modular and seated in a frame. Each unit comprises a continuous belt reeved about a driven and a driving rotor disposed in space relationship to each other and having a unique heating element disposed therein.

7 Claims, 3 Drawing Sheets

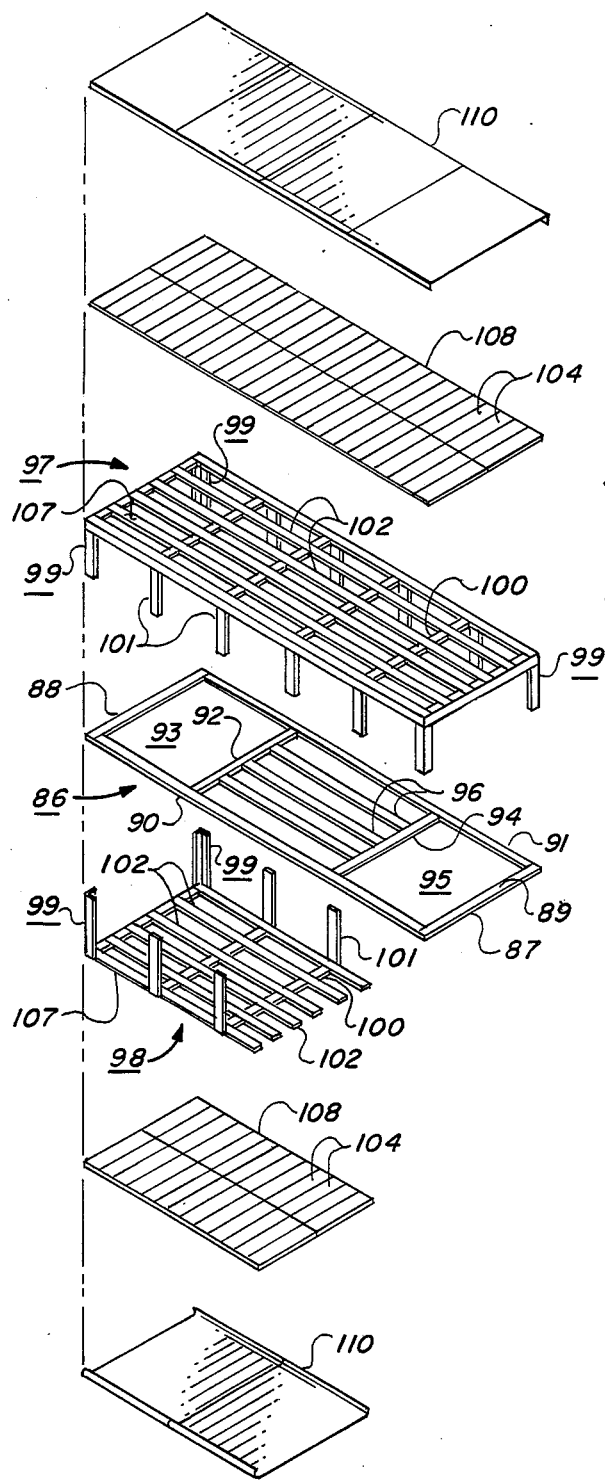
FIG. 3.
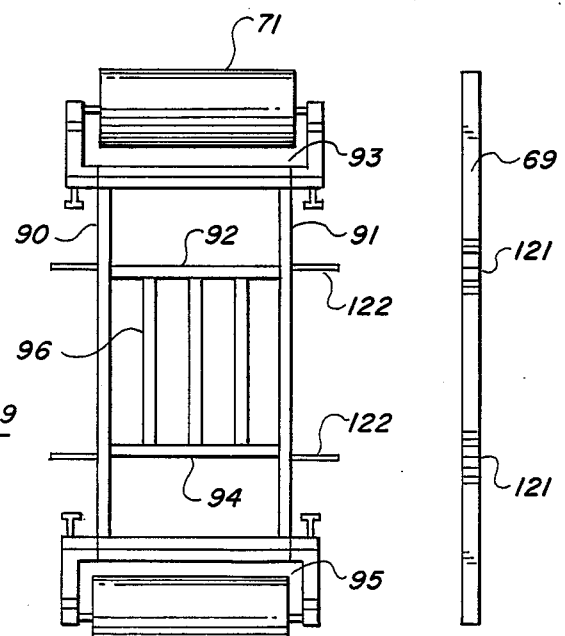
FIG. 4.
FIG. 5.
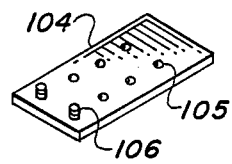
FIG. 6.

SYSTEM FOR SEGREGATING TRASH

INTRODUCTION

The present invention relates to a system for segregating trash, and more particularly to an assemblage for isolating various reclaimable fractions especially thermoplastics, from trash in a way which enables a community not only to profit from resale of the reclaimed materials but at the same time, prolongs the life of the community landfill.

BACKGROUND OF THE INVENTION

The growing amounts of throw-away packaging, and, in general, the yearly increase in municipal waste have created a major public concern over how to effectively and safely dispose of such materials. It is well known that existing landfill facilities are becoming filled, and that new facilities are becoming even more difficult to acquire as the population grows and open spaces are being occupied with housing. Indeed, the rising expense of land acquisition and refuse disposal has become a major social problem which can only be curbed by the development of new means and methods of refuse disposal which avoid both direct incineration, which is very costly and frequently hazardous to community air quality, and landfill expansion.

Further, the collection of reclaimable fractions from municipal garbage provides an opportunity for communities involved with refuse collection to offset some of the cost associated with pickup and disposal operations by the subsequent sale of the reclaimed materials.

Of particular interest is a system for isolating and disposing plastic materials which are present in increasing amounts in a mixed refuse load. The burial of untreated plastic in landfills has proven to be an undesirable alternative because the irregularly shaped plastic parts create air voids which makes the fill difficult to compact. Even when comminuted or minced to reduce the particle size, such plastic wastes still have a great propensity to float if the landfill is subjected to water inundation thereby still reducing the effective capacity of the landfill to accept waste material.

The specific density of ferrous and non-ferrous metals, glass, miscellaneous dirt and fines and like materials allows these materials to be subject to preliminary separation, but cloth, cellulose articles, and like plastic materials still require special techniques to obtain their separation therefrom.

The use of thermoplastic polymeric materials which can be shaped or molded has become very popular for containers, packaging and even furniture. Such materials as polyethylene, polypropylene, polystyrene, polyvinyl chloride and the like are designated as thermoplastic because they soften when heated to between 230° F. and 500° F. and form a sticky surface enabling the plastic to adhere to a contact surface. Polyesters, phenolics, and the like are not thermoplastic and will not form a sticky adhesive surface when heated.

The final disposition of such plastic materials heretofore has been a landfill, an incinerator, and, in some instances, the materials have been isolated and thereafter recycled into other products. Most thermoplastic materials when incinerated will yield about 16,000 BTU per pound (excluding polyvinyl chloride which should never be incinerated because when it is combusted, it liberates free chlorine which dissolves in water to form hydrochloric acid) providing sufficient energy to fuel the incineration process. If polyvinyl chloride is included in the charge of materials subjected to the incineration process, the incinerator must be equipped to resist the corrosive nature of the chlorine derivatives as well as to wash the derivatives from the stack gases.

Landfill operations from heated plastics are easier and require less space as the plastics are "crinkled" and densified during the heating process which also makes size reduction for more efficient packing easier. The use of recovered thermoplastic wastes in the formation of new material is somewhat more difficult in that the contributing waste material must be of more or less constant composition. Completely charred plastics may be used as carbon particulates in the reinforcement of rubber products.

One prior art teaching, Fyfe et al (U.S. Pat. No. 3,599,788), relates to a method of removing waste thermoplastic materials from an assortment of waste materials being conveyed past a thermoplastic removal station. The method employs a rotatable cylinder contacting the material due to its own weight and either driven by the movement of the conveying means or in synchronism therewith from an independent power source. The cylinder has a surface of contact with the materials, and means provided to heat the cylinder to a temperature which softens the thermoplastic materials to a sufficient extent to enable the materials to adhere to the heated surface and be carried away from the conveying means. The softened and adhered thermoplastic material is thereafter removed from the cylinder with a scraper and directed to a collection point.

While Fyfe describes the broad idea of using a heated drum to segregate thermoplastics, the limited surface area of such a heated drum, considering the volume of waste flow, requires that it be heated to a very high temperature causing the drum to become glazed with sticky thermoplastic material. Furthermore, cellulosic materials and fine particulates adhere to the gummy drum surface and ultimately impair its function.

Thus a need exists for a scheme of waste segregation which will permit some species of waste to be incinerated, others to be transported to a landfill, and still others, recaptured and sold as reclaimed product. Accordingly, the present invention is directed to means and methods for segregating municipal garbage and trash into discrete fractions of ferrous metals, non-ferrous metals, glass, cloth, dirt and fines, thermoplastics and paper.

BRIEF SUMMARY OF THE INVENTION

The present invention relates to means and methods of segregating municipal garbage and waste into discrete fractions and is especially directed to the segregation of thermoplastic materials. The means therefor consist of a staggered tiered heated multi-belt system for the removal and collection of thermoplastic materials from normal trash. Means are provided to heat the transport and collection belt, to remove the collected thermoplastic material, to remove the nonthermoplastic material, and to transport the collected thermoplastic and non-thermoplastic material to specific storage or staging areas.

Accordingly, the principal object of the present invention is to provide a new and improved assemblage comprising a segmented and comparatively large area of heated belt whereupon thermoplastic materials are sequentially preheated to a temperature at which they ultimately adhere to but do not fuse to a heated belt surface from which they are subsequently removed by a scraper blade for collection and further disposition.

Another object of the present invention is to provide means and methods utilizing staggered tiered heated belts in order to insure complete and specific thermoplastic waste removal, to provide a waste transportation system, and to provide economy of space.

A still further object of the present invention is to provide means and methods for isolating and collecting thermoplastic materials from mixed trash which enables the effective life of landfills to be prolonged while subsidizing the cost of the reclamation operation.

Still another object of the present invention is to provide new and improved apparatus for segregating and collecting specific fractions of the heterogeneous trash having a plurality of staggered modular selectively heated selectively movable conveyor belts for pretreating and segregating thermoplastic materials therefrom.

These and still further objects as shall hereinafter appear are readily fulfilled by the present invention in a remarkably unexpected manner as will be readily discerned from the following detailed description of an exemplary embodiment thereof especially when read in conjunction with the accompanying drawing in which like parts bear like numerals throughout the several views.

BRIEF DESCRIPTION OF THE DRAWINGS

In the drawing:

FIG. 3 is an exploded view of the belt heater and supports of the assemblage of FIG. 2;

FIG. 4 is a top view of a conveyor belt support assembly;

FIG. 5 is a rear elevation of a support member for the conveyor belt assembly; and FIG. 6 is an isometric view of a heater element for use with the present invention.

DESCRIPTION OF THE PREFERRED EMBODIMENTS

Figure 1:
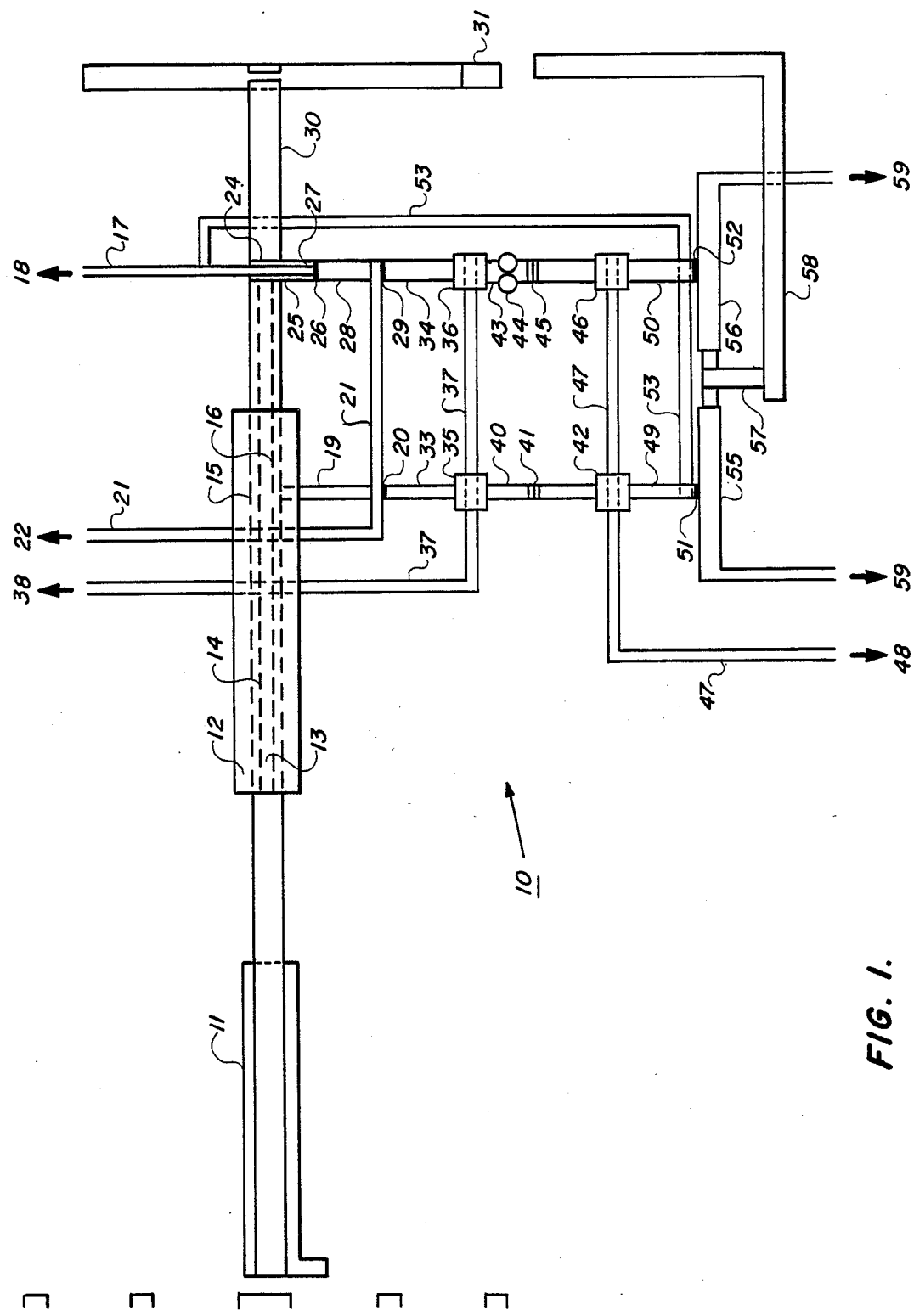
FIG. 1 is a schematic diagram showing an integrated system for trash separation and classification in accordance with the present invention.

Referring to the drawing, and particularly to the schematic diagram shown in FIG. 1, a system of processing typical community trash into various collectable fractions in accordance with the present invention is identified by the general reference 10.

Specifically, a mixed trash burden is introduced into the system at inlet 11 from which it is passed into a conventional trommel 12 having a central screen 13 which separates the various materials within the charge by particle size, the smaller particles passing through the central screen 13 onto a pair of converging conveyor belts 14, 15 disposed therebeneath. The material reaching conveyor belts 14, 15 is essentially the small bits and pieces of the cloth, glass, ferrous metals, non-ferrous metals and like constituents of run-of-the-mill trash.

Conveyor belts 14, 15 deliver the matter accumulated thereupon to an inline magnetic separator 16 which removes the ferrous metals from the mixture and delivers them to another conveyor belt 17 leading to a ferrous metal collector 18.

The non-magnetic substances in the material remaining on conveyor belts 14, 15 (after the ferrous metal is removed therefrom), is directed to a conveyor 19 which passes beneath a rotating brush on spindle 20 which removes the cloth pieces from the burden and causes it to drop onto conveyor belt 21 for delivery to cloth collector 22.

While this is occurring, the large materials in the original trash burden which did not pass through the openings in screen 13 and therefore are retained thereon migrate out the end of cylindrical screen 13 to size metering device 24 which essentially comprises a gap or opening of a preselected dimension through which material of a lesser dimension is dropped onto another conveyor belt 25 which passes its burden into a second magnetic separator 26 which collects the ferrous metal material for transport by conveyor belt 27 which delivers its load to ferrous metal collector 18 while the rest of the burden is passed by conveyor 28 to a second rotary brush on spindle 29 which functions to remove the large cloth matter from the burden and delivers it to an extension of conveyor 21 for transport to cloth collector 22.

The oversize material which passes over size meter 24 is dropped onto another conveyor belt 30 which delivers this material to a shredder 31, the output of which is delivered to a landfill or the like (not shown).

The material passing rotating brushes 20, 29 now proceeds in parallel paths on conveyors 33, 34, respectively, into rotating screens 35, 36, each of which drop all of the dirt and fines onto extending conveyor belt 37 which delivers this cargo to the dirt and fines collector 38.

The residue from screen 35 passes via another conveyor 40 into a first crusher 41 and then to a third rotating screen 42 while the residue from rotating screen 36 is passed via conveyor 43 through a roll mill 44 and a second crusher 45 and then into a fourth rotating screen 46. Rotating screens 42, 46 pass the comminuted glass particles from the burden onto a conveyor belt 47 which directs its load to glass collector 48.

At this point in the system, the burden remaining to be processed is predominantly thermoplastic, paper, wood, food scraps, yard wastes and some ferrous and non-ferrous metals.

The essentially glass-free burden is taken from rotating screens 42, 46 onto conveyors 49, 50, respectively, to supplementary magnetic separators 5!, 52 which catch the remaining magnetic material and deliver it by means of conveyor belt 53 to conveyor belt 17 which carries it to ferrous metal collector 18.

The material not removed by the magnetic separators 51, 52 is then dumped into large flotation tanks 55, 56 which separate the remaining material by density, that is, the metals, food waste and other heavier materials, i.e., those materials having a specific gravity in excess of 1.0, sink and form a sludge which is delivered to sludge tank 59 while the lighter materials such as paper, plastic, wood, and yard clippings float.

The floating output of tanks 55, 56 is delivered by a common conduit 57 to plastic segregator assembly 58 from which the thermoplastics are uniquely segregated therefrom in a manner to be now described.

Figure 2:
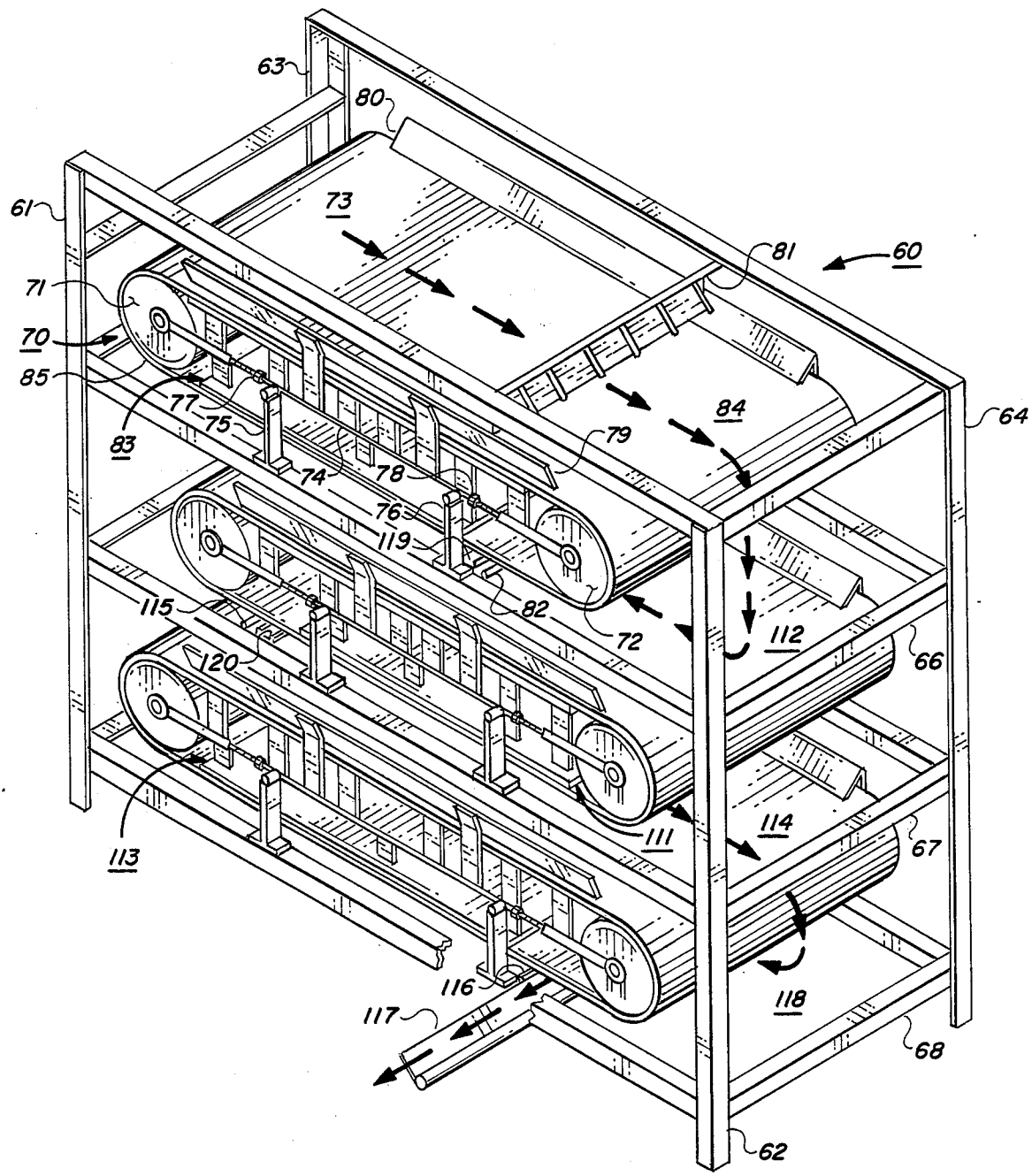
FIG. 2 is a perspective view of assemblage for isolating and collecting thermoplastic materials in accordance with the present invention.

Referring now to FIG. 2, the assemblage for segregating the thermoplastic matters from other trash is identified by the general reference 58 and consists of a vertical skeletal frame member 60 formed by a first, a second, a third and a fourth vertical post, 61, 62, 63 and 64, respectively, placed in upstanding generally parallel relationship to each other and in operative position to support a first horizontal frame member 65 at the top thereof and a second, third and fourth horizontal rectangular frame 66, 67, and 68, respectively, mounted therebeneath in spaced substantially parallel relationship to each other and to horizontal frame member 65.

A modular heated conveyor belt assembly 70 is mounted in the gap between frame 65 and frame 66. Each conveyor belt assembly 70 comprises a driving roller 71 and a driven roller 72 spaced at opposite ends of the gap and circumscribed by an endless belt 73. An adjustable support rod 74 extends between the axis of rotation of each roller 71, 72 on each end of the rollers and is disposed upon and supported by a first and second support stand 75, 76, respectively. A like setup occurs at the rear of the assembly (not shown). Support stands 75, 76, and the rear counterparts thereof, are seated on and secured to horizontal frame 66 and coact therewith to maintain support rod 74, hence rollers 71, 72 in spaced substantially parallel operative relationship thereto. A pair of turnbolts 77, 78 are operatively interposed axially in support rod 74 to permit the distance between rollers 71 and 72 to be varied to allow the tension in belt 73 to be readily adjusted to meet operating exigencies.

An alternative to a rearward counterpart of support stands 75, 76 involves the use of cross-beam 69 as shown in FIG. 5 which has suitable notches 121 defined therein to support cross members 122 which extend outwardly from members 91 of main frame 86. The extra notches 121 provide the staggered effect between subjacent heater units as herein described in more detail elsewhere.

Suitable guide assemblies 79, 80 are mounted to and extend upwardly from each support rod 74 and provide a curbing on each lateral edge of belt 73 to prevent spillage therefrom. Suitable air jets 81 are disposed transversely across first horizontal frame 65 adjacent the feed thereto and compact and disburse the trash burden substantially uniformly across belt 73.

Subjacent to belt 73 in operative relationship to the lower run 85 thereof, a scraper bar 82 is mounted transversely thereof in abutting relationship to belt 73 to remove the soft adhering thermoplastic therefrom and allow it to drop therefrom onto the operating surface therebelow.

Referring now to FIGS. 3 and 4, each conveyor belt assembly has a modular heater unit 83 mounted therein between the upper run 84 and the lower run 85 of belt 73.

Each heater unit 83 contains a centrally positioned main frame 86 having a rectangular outer frame 87 formed by joining together a first end member 88, a second end member 89, a first side member 90 and a second side member 91.

A first intermediate cross member 92 is secured between side member 90 and side member 91 in spaced generally parallel relationship to end member 88 to define a first roller bed 93 therebetween. A second intermediate cross member 94 is secured between side member 90 and side member 91 in spaced generally parallel relationship to end member 89 to define a second roller bed 95 therebetween. A plurality of axially extending reinforcing members 96 are operatively disposed between cross members 92, 94 and extend normal thereto in spaced generally parallel relationship to each other and to side members 90, 91.

Sandwiched about main frame 86 are an upper grid support 97 and a lower grid support 98.

Each grid support, for example support 97, comprises a plurality of generally U-shaped members 99, each having a flat base member 100 and a pair of leg portions 101 extending outwardly therefrom. The U-shaped members 99 are disposed in spaced generally parallel relationship to each other. U-shaped members 99 are joined together by a plurality of axially extending rod members 102 secured to the base member 100 of each member 99 and disposed in spaced generally parallel relationship to each other.

Grid support 98 is constructed the same as support 97 but is inserted relative thereto so that the leg members 101 extending upwardly (relative to FIG. 3) therefrom are in alignment with leg members 101 extending downwardly from grid support 97 for attachment to side members 90, 91 of main frame 86.

A plurality of rectangular heating elements 104, each of which may have one or more openings 105 defined therein for passing a bolt 106 therethrough to secure element 104 to the remote surface 107 of a corresponding grid support 97, 98, are mounted in abutting relationship to like elements 104 until a complete heater plate 108 is defined thereby on said surface 107.

Each heater plate 108 is then covered with a heat conductive protective wear plate 110 to complete the assembly.

One complete heater unit 83 is mounted between horizontal frames 65, 66 and within belt 73 while a corresponding second modular unit 111 is mounted between frames 66, 67 within belt 112 and a third corresponding modular heater unit 113 is mounted between frames 67, 68 within belt 114.

Scraper blades 82, 115 are mounted in operative relationship near the egress of each of the belts 73 and 112 to facilitate the removal of adhered plastic whereas a scraper 116 is mounted in operative relationship to the underside of belt 114 to effect the final plastic removal therefrom for disposal into plastic collector trough 117. Side channels or guides 79, 80 mounted close to the edge of each upper run 84 of belt 73 are repeated for belts 112, 114 to retain the moving trash on the heated belt during the operation. Not shown is the ancillary motor drive system coupled by chain or drive belt to the metallic drive cylinders and the electrical heater connections which are well known in the art. In one preferred practice hereof, a quick disconnect hydraulic drive system is used to actuate the driver rollers in the conveyor systems.

In operation, each of the belts 73, 112 and 114 are preheated by their corresponding heater units 83, 111 and 113. The speed of belts 73, 112 and 114 are adjusted to move the top belt 73 at about one foot per second, middle belt 112 slightly faster, and the bottom belt 114 even faster than the middle belt 112. The trash burden fed at input 57 is sprayed by air jets 81, which if desired can deliver preheated air, and thereafter moved toward the scraper blade held in operative relationship to the lower run 85 of belt 73. Scraper blade 82 removes all of the semi-soft plastic material from the moving belt 73 and causes the semi-soft plastic to drop into means for delivery via trough 119 to plastic collection trough 117 while the remaining burden drops onto middle belt 112 which is strategically staggered to receive all of the other material which falls from top belt 73. Middle belt 112 is staggered in an opposite direction relative to belt 73 to catch material falling from belt 73 and to drop material onto belt 114. Belt 112 is likewise equipped with a scraper-like blade 115 disposed beneath belt 112 which causes the semi-soft plastic to be delivered via trough 120 to plastic collection trough 117. The materials on belt 112 are thus removed and fall to belt 114 which is likewise staggered so as to receive materials falling from belt 112. Belt 114 rotates in a direction opposite to belt 112 but in the same direction as belt 73. The various scrapers disposed beneath the several belts scrape the semi-soft plastic from the corresponding belt 73. The non-thermoplastic trash that drops off belt 114 passes through an opening 118 where it is collected for further handling.

In our preferred practice of the present invention, belts 73, 112 and 114 will be formed of a heat resistant, flexible, wear resistant material such as TEFLON brand of polytetrafluorethylene, synthetic cross-linked rubber, woven fibers, ceramic-coated materials and the like.

Structural elements will be formed of conventional structural materials such as steel and other ferrous alloys, aluminum, aluminum alloys and the like.

From the foregoing, it becomes apparent that new and useful means and methods have been herein described and illustrated which fulfill all of the aforesaid objectives in a remarkably unexpected fashion. It is of course understood that such modifications, alterations and adaptations as may readily occur to an artisan having the ordinary skills to which this invention pertains are intended within the spirit of the present invention which is limited only by the scope of the claims appended hereto.

Accordingly what is claimed is:

1. A system for segregating trash containing thermoplastic material and non-thermoplastic material into collectable fractions comprising a plastic segregator assemblage having a vertical frame member, a plurality of horizontal frame members mounted to said vertical frame member in spaced generally parallel relationship to each other, and a plurality of heated conveyor units, one of said heated conveyor units being mounted between and to each pair of adjacent ones of said horizontal frame members in staggered relationship to each other, each of said conveyor units having a driving roller, a driven roller disposed in rigid spaced operative relationship to said driving roller, and an endless conveyor belt reeved around said driven roller and said driving roller said belt being operable in response to said driven roller to transport trash placed thereupon to the end of thereof to provide a continuous flow of trash therealong with gradual heating until substantially all of said thermoplastic contained therein adheres to one of said belts while non thermoplastic material pass therefrom; said heated conveyor unit having a heater unit operatively disposed between said rollers and between the upper and lower run of each said endless conveyor belt, said heater unit having a main frame an upper grid support superposed to said main frame and having a surface facing said conveyor belt and a plurality of leg members depending therefrom into supportive engagement with said main frame, a lower grid support subposed to said main frame and having a surface facing said conveyor belt and a plurality of leg members extending upwardly therefrom into supportive engagement with said main frame, a first and second heat plate, said first plate being secured to said facing surface of said upper grid support and said second plate being secured to said facing surface of said lower grid support, and means for removing said adherent thermoplastic material from each said belt.

2. A system according to claim 1 in which each of said heated conveyor units is modular.

3. A system according to claim 1 in which said plastic segregator assemblage is positioned to receive trash after fine particulates, ferrous metal, non-ferrous metal, cloth and glass has been removed therefrom.

4. A system according to claim 1 in which each said heater plate has a protective wear plate attached thereto.

5. A system according to claim 1 in which each said heated conveyor unit has a support rod extending between the centers of said roller at each end thereof; and a plurality of support means extending upwardly from each said horizontal frame disposed beneath one of said conveyor units into supporting engagement with said support rod corresponding to said conveyor unit to hold each said conveyor unit in spaced operable relationship between two adjacent ones of said horizontal support frames.

6. A system according to claim 1 having a first, a second and a third of said heated conveyor units in vertical displacement relative to each other, said first and said third units being in vertical alignment with each other and movable in a first direction, said second unit being horizontally offset from said vertical alignment and movable in a direction opposite to said first direction.

7. A system according to claim 6 in which said belt in said first unit travels at a first speed, said belt in said second unit travels at a second speed which is greater than said first speed, and said belt in said third unit travels at a speed which is greater than said second speed.

* * * * *